US012716784B2

(12) United States Patent
Rud

(10) Patent No.: US 12,716,784 B2
(45) Date of Patent: Aug. 25, 2026

(54) PROCESS FLUID TEMPERATURE ESTIMATION USING IMPROVED HEAT FLOW SENSOR

(71) Applicant: Rosemount Inc., Shakopee, MN (US)

(72) Inventor: Jason H. Rud, Chanhassen, MN (US)

(73) Assignee: Rosemount Inc., Shakopee, MN (US)

( * ) Notice: Subject to any disclaimer, the term of this patent is extended or adjusted under 35 U.S.C. 154(b) by 518 days.

(21) Appl. No.: 17/710,031

(22) Filed: Mar. 31, 2022

(65) Prior Publication Data

US 2023/0314239 A1 Oct. 5, 2023

(51) Int. Cl.

*G01K 7/16* (2006.01)
*G01K 7/02* (2021.01)
*G01K 7/04* (2006.01)

(52) U.S. Cl.

CPC ............... *G01K 7/16* (2013.01); *G01K 7/021* (2013.01); *G01K 7/04* (2013.01)

(58) Field of Classification Search

CPC ............ G01K 7/16; G01K 7/021; G01K 7/04; G01K 1/143; G01K 7/42; G01K 13/02; G01K 7/02

See application file for complete search history.

(56) References Cited

U.S. PATENT DOCUMENTS 5,469,855 A * 11/1995 Pompei ................... G01J 5/064 600/549
5,669,713 A * 9/1997 Schwartz ............... G01K 15/00 374/1

(Continued)

FOREIGN PATENT DOCUMENTS

CN 103385700 A * 11/2013
CN 113091931 A 7/2021

(Continued)

OTHER PUBLICATIONS

Microstar Laboratories, "Thermocouple cold junctions", Mar. 2, 2020, web.archive.org/web/20200302052628/https://www.mstarlabs.com/sensors/thermocouple-cold-junctions.html (Year: 2020).*

(Continued)

*Primary Examiner* — Yossef Korang-Beheshti

(74) *Attorney, Agent, or Firm* — Christopher R. Christenson; Kelly, Holt & Christenson, P.L.L.C.

(57) ABSTRACT

A process temperature estimation system includes a mounting assembly configured to mount the process fluid temperature estimation system to an external surface of a process fluid conduit. A hot end thermocouple is thermally coupled to the external surface of the process fluid conduit. A resistance temperature device (RTD) is spaced from the hot end thermocouple. Measurement circuitry is coupled to the hot end thermocouple and is configured to detect an emf of the hot end thermocouple and a resistance of the RTD that varies with temperature and provide sensor temperature information. A controller is coupled to the measurement circuitry and is configured to measure a reference temperature based on the resistance of the RTD and employ a heat transfer calculation with the reference temperature, the emf of the hot end thermocouple, and known thermal conductivity of the process fluid conduit to generate an estimated process temperature output.

15 Claims, 8 Drawing Sheets

(56) References Cited

U.S. PATENT DOCUMENTS

| | | | | |
|---|---|---|---|---|
| 10,317,295 | B2 | 6/2019 | Rud et al. | |
| 10,670,546 | B2 | 6/2020 | Rud et al. | |
| 10,760,742 | B2 | 9/2020 | Rud et al. | |
| 10,976,204 | B2 | 4/2021 | Rud et al. | |
| 11,029,215 | B2 | 6/2021 | Cavanaugh | |
| 11,073,429 | B2 | 7/2021 | Rud et al. | |
| 11,085,589 | B2 | 8/2021 | Rud et al. | |
| 11,320,316 | B2 | 5/2022 | Rud et al. | |
| 2010/0302008 | A1* | 12/2010 | Engelstad | G01K 7/20 340/10.1 |
| 2011/0299562 | A1* | 12/2011 | Hashemian | G01K 15/005 374/182 |
| 2011/0299567 | A1* | 12/2011 | Rud | G01K 7/026 374/E7.004 |
| 2012/0051399 | A1 | 3/2012 | Rud et al. | |
| 2015/0185085 | A1 | 7/2015 | Converse | |
| 2018/0238743 | A1* | 8/2018 | Rud | G01K 7/16 |
| 2019/0101456 | A1* | 4/2019 | Phillips | G01K 3/00 |
| 2019/0277711 | A1* | 9/2019 | Rud | G01K 1/16 |
| 2019/0293497 | A1* | 9/2019 | Rud | G01K 7/42 |
| 2020/0096397 | A1* | 3/2020 | Rud | G01K 1/143 |
| 2020/0103293 | A1* | 4/2020 | Rud | G01K 7/427 |
| 2020/0150064 | A1 | 5/2020 | Rud et al. | |

FOREIGN PATENT DOCUMENTS

| | | | |
|---|---|---|---|
| GB | 1311405 | A | 3/1973 |
| JP | H07198503 | A | 8/1995 |
| KR | 19990042026 | U | 12/1999 |
| KR | 20080032331 | A | 4/2008 |

OTHER PUBLICATIONS

Omega, “Cold junction compensation for thermocouples”, 10/23/202, web.archive.org/web/20201023090547/https://www.omega.com/en-us/resources/thermocouple-junction-principles (Year: 2020).*

Bapi, “RTD Overview”, Aug. 1, 2021, https://web.archive.org/web/20210801164148/https://www.bapihvac.com/rtd-overview/ (Year: 2021).*

Omega, “Temperature Probes”, Jun. 21, 2021, https://web.archive.org/web/20210621040124/https://www.omega.co.uk/temperature/z/thermocouple-rtd.html (Year: 2021).*

Office Action for Chinese Patent Application No. 202320566131.0, Dated Nov. 15, 2023, 4 pages including English Translation.

Search Report Written Opinion for PCT Application No. PCT/US2023/062975, Dated Jun. 9, 2023. 11 pages.

U.S. Appl. No. 17/487,750, application and drawings, 21 pages.

U.S. Appl. No. 17/490,467, application and drawings, 22 pages.

U.S. Appl. No. 63/189,377, application and drawings. 7 pages.

U.S. Appl. No. 17/848,625, application and drawings, 26 pages.

First Chinese Office Action for Chinese Application No. 202320566131.0 dated Jul. 28, 2023, 5 pages.

Notification of Reasons For Rejection for Japanese Application No. 2024-557557, mailed Aug. 12, 2025, 07 Pages.

International Preliminary Report on Patentability for International Application No. PCT/US2023/062975, dated Oct. 10, 2024, 07 Pages.

Extended European Search Report for European Application No. 23781951.1, mailed Mar. 5, 2026, 08 Pages.

Decision of Rejection for Chinese Application No. 202310280703.3 , dated Mar. 19, 2026, 15 pages.

Office action for Indian application No. IN202427068836 mailed Jun. 3, 2026, 9 pages.

* cited by examiner

PROCESS FLUID TEMPERATURE ESTIMATION USING IMPROVED HEAT FLOW SENSOR

BACKGROUND

Many industrial processes convey process fluids through pipes or other conduits. Such process fluids can include liquids, gasses, and sometimes entrained solids. These process fluid flows may be found in any of a variety of industries including, without limitation, hygienic food and beverage production, water treatment, high-purity pharmaceutical manufacturing, chemical processing, the hydrocarbon fuel industry, including hydrocarbon extraction and processing as well as hydraulic fracturing techniques utilizing abrasive and corrosive slurries.

It is common to place a temperature sensor within a thermowell, which is then inserted into the process fluid flow through an aperture in the conduit. However, this approach may not always be practical in that the process fluid may have a very high temperature, be very corrosive, or both. Additionally, thermowells generally require a threaded port or other robust mechanical mount/seal in the conduit and thus, must be designed into the process fluid flow system at a defined location. Accordingly, thermowells, while useful for providing accurate process fluid temperatures, have a number or limitations.

More recently, process fluid temperature has been estimated by measuring an external temperature of a process fluid conduit, such as a pipe, and employing a heat flow calculation. This external approach is considered non-invasive because it does not require any aperture or port to be defined in the conduit. Accordingly, such non-intrusive approaches can be deployed at virtually any location along the conduit.

SUMMARY

A process temperature estimation system includes a mounting assembly configured to mount the process temperature estimation system to an external surface of a process fluid conduit. A hot end thermocouple is thermally coupled to the external surface of the process fluid conduit. A resistance temperature device (RTD) is spaced from the hot end thermocouple. Measurement circuitry is coupled to the hot end thermocouple and is configured to detect an emf of the hot end thermocouple and a resistance of the RTD that varies with temperature and provide sensor temperature information. A controller is coupled to the measurement circuitry and is configured to measure a reference temperature based on the resistance of the RTD and employ a heat transfer calculation with the reference temperature, the emf of the hot end thermocouple, and known thermal conductivity of the process fluid conduit to generate an estimated process temperature output.

DETAILED DESCRIPTION

As set forth above, there are numerous applications where heat flow measurements and non-invasive process fluid temperature estimation provide a better way to measure process temperature than using thermowells. Some commercially available non-invasive process fluid temperature estimation systems use the conduit external surface (i.e., skin) temperature measurement in combination with an internal transmitter measurement, such as a temperature of a transmitter terminal within a transmitter housing and use these two measurements in a heat flow calculation to infer the internal process fluid temperature inside the conduit. However, commercially-available offerings have generally been limited to a relatively lower temperature range. In order to extend the temperature range of process fluid temperature estimation systems, thermocouples (which generally have a higher maximum temperature than RTDs) have been used for process fluid temperature estimation measurement inputs. While thermocouples may allow the maximum temperature to be extended for process fluid temperature estimation, there are some inherent challenges with thermocouple technology. One such inherent challenge includes measurement uncertainty.

Figure 1:
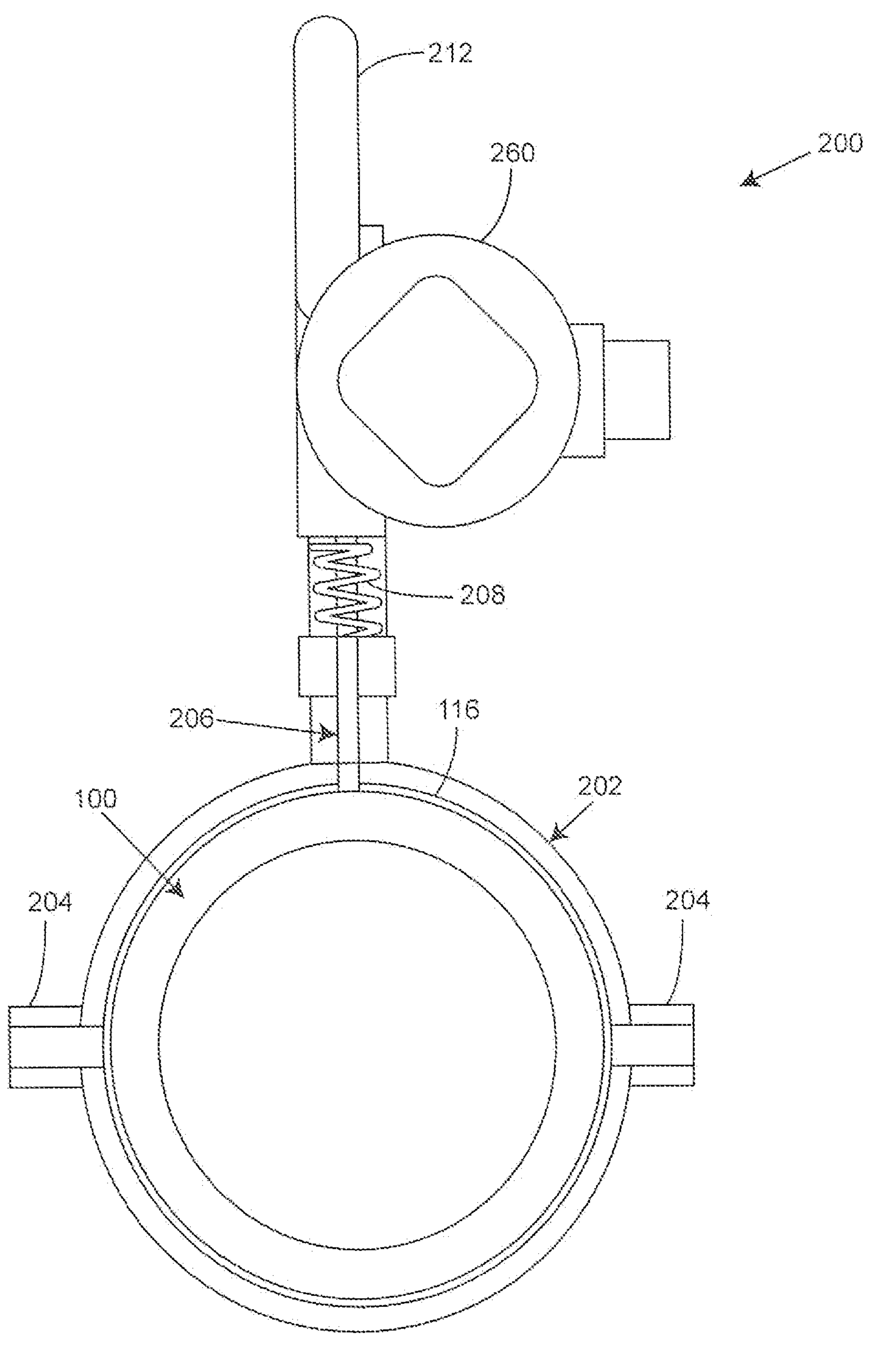
FIG. 1 is a diagrammatic view of a process fluid temperature estimation system with which embodiments of the present invention are particularly applicable.

FIG. 1 is a diagrammatic view of a process fluid temperature estimation system with which embodiments of the present invention are particularly applicable. System 200 generally includes a pipe clamp portion 202 that is configured to clamp around conduit or pipe 100. Pipe clamp 202 may have one or more clamp ears 204 to allow clamp portion 202 to be positioned and clamped to pipe 100. Pipe clamp portion 202 may replace one of clamp ears 204 with a hinge such that pipe clamp 202 can be opened to be positioned on a pipe and then closed and secured by clamp ear 204. While the clamp illustrated with respect to FIG. 1 is particularly useful, any suitable mechanical arrangement for securely positioning system 200 about an exterior surface of a pipe can be used in accordance with embodiments described herein.

System 200 includes a heat flow sensor capsule 206 that is urged against external diameter 116 of pipe 100 by spring 208. The term "capsule" is not intended to imply any structure or shape and can thus be formed in a variety of shapes, sizes, and configurations. While spring 208 is illustrated, those skilled in the art will appreciate that various techniques can be used to urge sensor capsule 206 into continuous contact with external diameter 116.

Sensor capsule 206 generally includes one or more temperature sensitive elements. Temperature sensitive elements within capsule 206 are electrically connected to transmitter circuitry within housing 260, which is configured to obtain one or more temperature measurements from sensor capsule 206 and calculate an estimate of the process fluid temperature (or inside surface of the pipe) based on the measurements from sensor capsule 206, and a reference temperature, such as a temperature measured within housing 260, or otherwise provided to circuitry within housing 260. In one example, the basic heat flow calculation can be simplified into:

$$T_{corrected}=T_{skin}+(T_{skin}-T_{reference})*(R_{pipe}/R_{sensor}).$$

In this equation, $T_{skin}$ is the measured temperature of the external surface of pipe 100. $T_{reference}$ is a second temperature obtained relative to a location having a known thermal impedance ($R_{sensor}$) from the temperature sensitive element that measures $T_{skin}$. $T_{reference}$ is typically sensed by a dedicated sensor within housing 260. However, $T_{reference}$ can be sensed or inferred in other ways as well. For example, a temperature sensor can be positioned external to the transmitter to replace the terminal temperature measurement in the heat transfer calculation. This external sensor would measure the temperature of the environment surrounding the transmitter. As another example, industrial electronics typically have on-board temperature measurement capabilities. This electronics temperature measurement can be used as a substitute to the terminal temperature for the heat transfer calculation. As another example, if the thermal conductivity of the system is known and the ambient temperature around the transmitter is fixed or user-controlled, the fixed or user-controlled temperature can be used as the reference temperature.

$R_{pipe}$ is the thermal impedance of the conduit and can be obtained manually by obtaining pipe material information, pipe wall thickness, et cetera. Alternatively, a parameter related to $R_{pipe}$ can be determined during calibration and stored for subsequent use. Accordingly, using a suitable heat flux calculation, such as that described above, circuitry within housing 260 is able to calculate an estimate for the process fluid temperature ($T_{corrected}$) and convey an indication regarding such process fluid temperature to suitable devices and/or a control room. In the example illustrated in FIG. 1, such information can be conveyed wirelessly via antenna 212.

Figure 2:
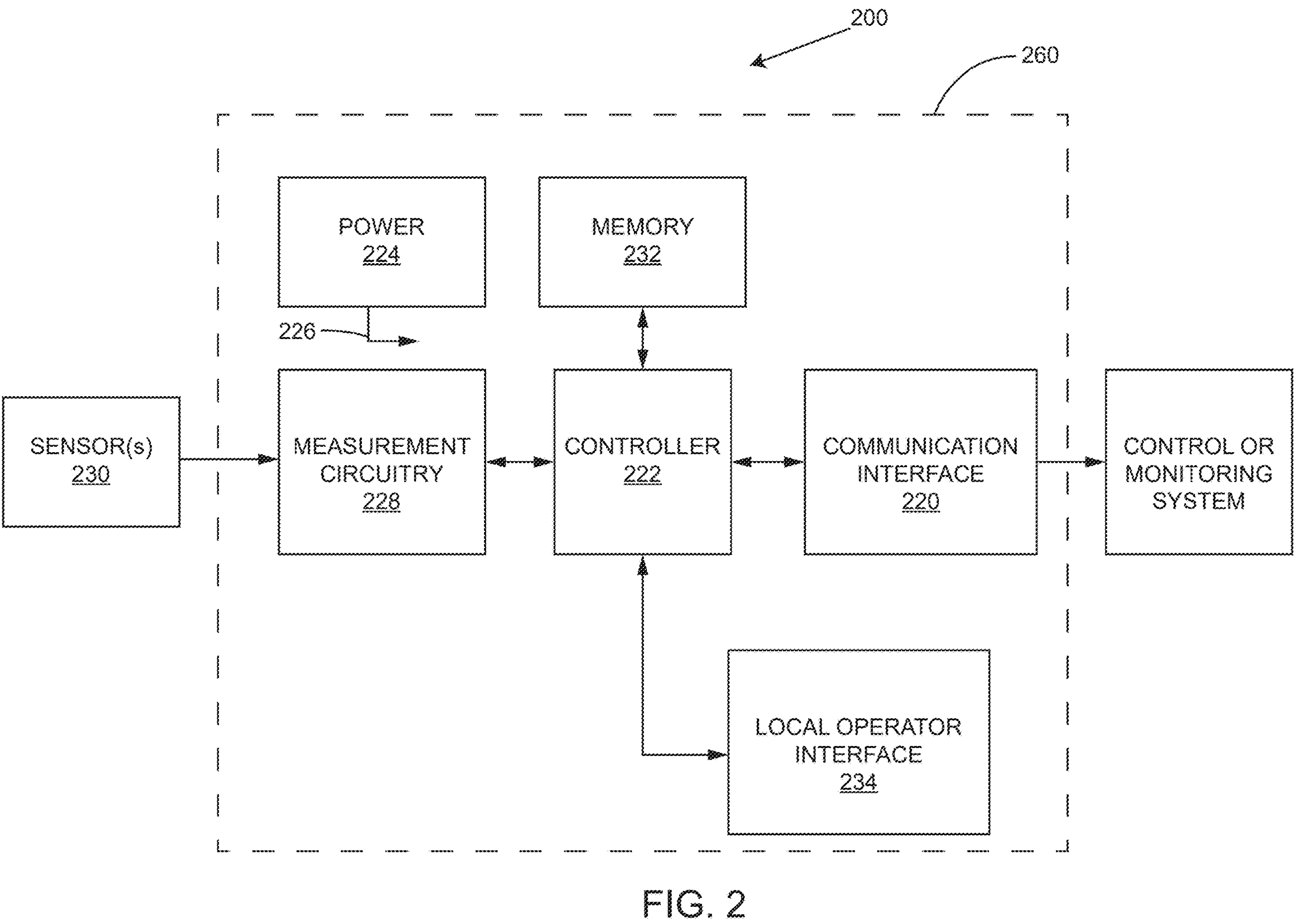
FIG. 2 is a block diagram of a process fluid temperature estimation system with which embodiments of the present invention are particularly applicable.

FIG. 2 is a block diagram of circuitry within housing 260 of process fluid temperature estimation system 200, with which embodiments of the present invention are particularly applicable. System 200 includes communication circuitry/interface 220 coupled to controller 222. Communication circuitry 220 can be any suitable circuitry that is able to convey information regarding the estimated process fluid temperature to an external device. Communication circuitry 220 allows the process fluid temperature estimation system 200 to communicate the process fluid temperature output over a process communication loop or segment. Suitable examples of process communication loop protocols include the 4-20 milliamp protocol, Highway Addressable Remote Transducer (HART®) protocol, FOUNDATION™ Fieldbus Protocol, and the WirelessHART protocol (IEC 62591).

System 200 also includes power supply module 224 that provides power to all components of system 200 as indicated by arrow 226. In embodiments where system 200 is coupled to a wired process communication loop, such as a HART® loop, or a FOUNDATION™ Fieldbus segment, power module 224 may include suitable circuitry to condition power received from the loop or segment to operate the various components of system 200. Accordingly, in such wired process communication loop embodiments, power supply module 224 may provide suitable power conditioning to allow the entire device to be powered by the loop to which it is coupled. In other embodiments, when wireless communication is used, power supply module 224 may include a source of power, such as a battery and suitable conditioning circuitry.

Controller 222 includes any suitable arrangement that is able to generate a heat-flow based process fluid temperature estimate using measurements from sensors within capsule 206 and/or a reference temperature measurement. Controller 222 may include or be coupled to memory 232 that stores instructions that, when executed by controller 222 cause controller 222 to perform the heat flow calculation, as well as any other functions of system 200. In one embodiment, controller 222 is a microprocessor.

Measurement circuitry 228 is coupled to controller 222 and provides digital indications with respect to measurements obtained from one or more temperature sensors 230. Measurement circuitry 228 can include one or more analog-to-digital converts and/or suitable multi-plexing circuitry to interface to one or more analog-to-digital converters to sensors 230. Additionally, measurement circuitry 228 can include suitable amplification and/or linearization circuitry as may be appropriate for the various types of sensors employed. As illustrated in FIG. 2, system 200 may include a local operator interface 234 that may include a display and/or one or more user actuatable buttons.

Figure 3:
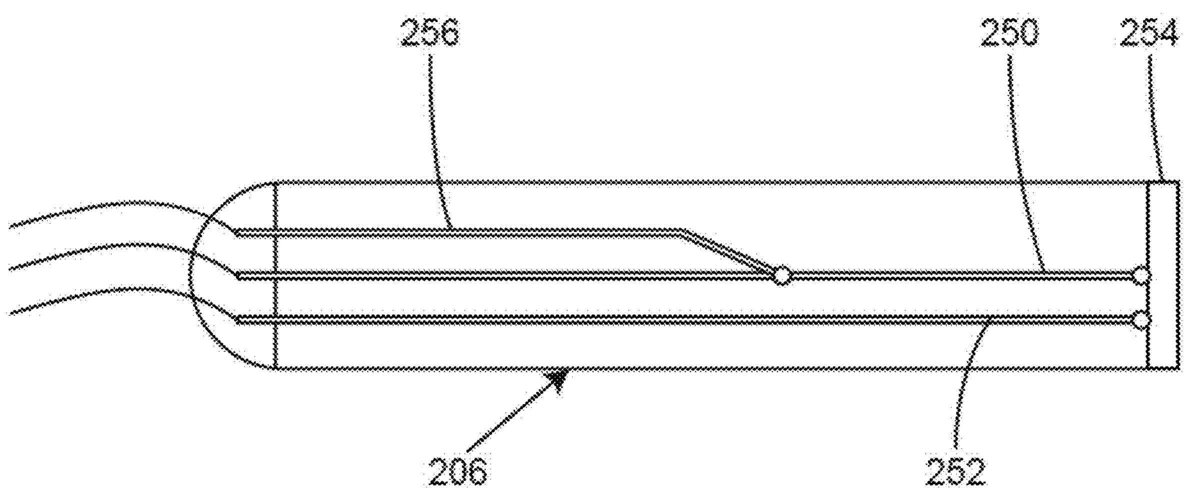
FIG. 3 is a diagrammatic view of a sensor capsule for a process fluid temperature estimation system in accordance with the prior art.

FIG. 3 is a diagrammatic view of a sensor capsule for a process fluid temperature estimation system in accordance with the prior art. In the illustrated sensor capsule, a first thermocouple is formed by a junction of thermocouple wires 250 and 252 with end cap 254. This first thermocouple senses the temperature of end cap 254, which is generally urged into contact with the external surface of the conduit. As illustrated, a second thermocouple is formed at the junction of thermocouple wires 250 and 256. This second thermocouple provides a reference temperature measurement. A difference in temperatures between the first and second thermocouple provides an indication of heat flow. While the dual thermocouple heat flux sensor of the prior art provides an effective solution for rugged extended-range temperature applications, it also has some limitations. One limitation is that is requires special wiring for an extension cable or unused conductors that could lead to wiring ease of use problems. Additionally, it may require special markings in order for the user to know which wire is for the hot end of the sensor and which is wire is for the sensor positioned away from the hot end (e.g., cold end). This marking ensures that proper wiring at the transmitter is performed effectively so that the transmitter can perform proper calculations. Still another limitation is that thermocouple extension wire is made from slightly different material from the thermocouple wire used in the sensor which will cause junctions of such wire to be susceptible to temperature gradients external to the sensor. Further, thermocouples are relatively difficult to calibrate since the voltage output is dependent on a temperature difference between the hot and cold junction of the thermocouple. Users that require calibration of the sensor for traceability will only have part of the measurement system calibration since the cold junction sensor is generally located in the transmitter head electronics. Finally, manufacturing characterization is a relatively complex process when considering external thermocouple wiring.

Figure 4:
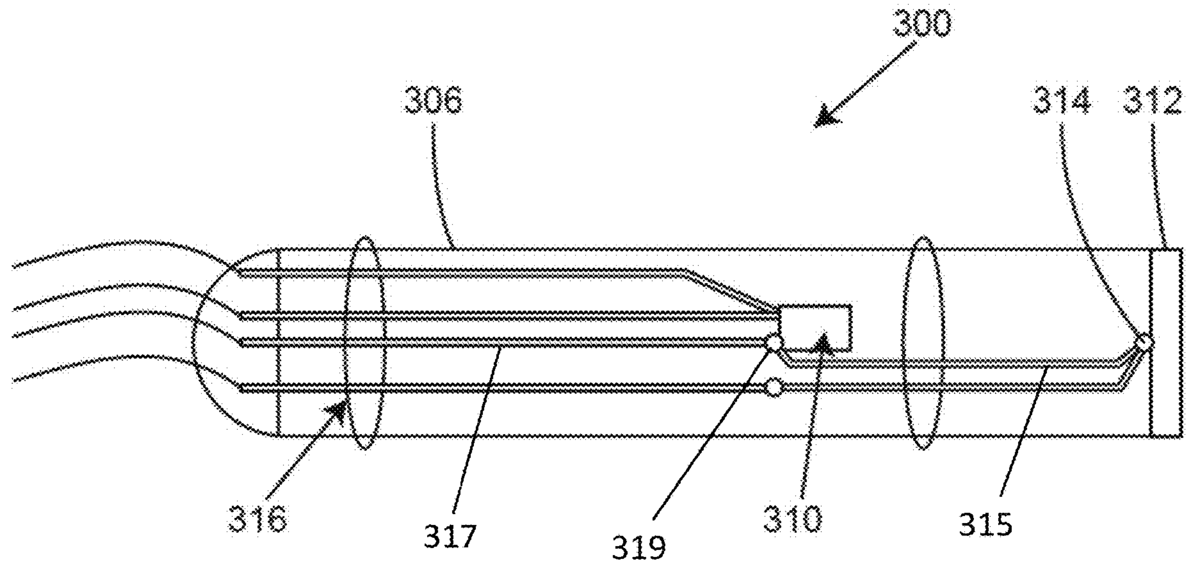
FIG. 4 is a diagrammatic view of an improved heat flux sensor in accordance with embodiments of the present invention.

FIG. 4 is a diagrammatic view of an improved heat flux sensor in accordance with embodiments of the present invention. In the illustrated embodiment, a heat flux sensor 300 is provided that utilizes an RTD (resistive temperature detector) as a reference within sensor capsule 306. As defined herein, RTD is any device having a resistance that varies with temperature. Examples include, without limitation, thin film resistance temperature devices, wire-wound resistance temperature devices, and thermistors. This reference RTD 310 is positioned away from the hot end 312 of sensor capsule 306 and employs a thermocouple 314 at the hot end so that the temperature difference between the hot end and the reference point can be determined. In the illustrated embodiment, four standard copper conductors 316 are provided back to the end user to make installation and connections easier to manage. As can be seen, special thermocouple extension wire is not required, and the heat flow sensor can be connected to the transmitter as a standard RTD without requiring a special connection scheme. RTD 310 is disposed in an area within sensor capsule 306 that will protect RTD 310 from extreme process temperature. This position can be determined through evaluation of the capsule construction thermal conductivity during design time (through testing on standard sensors, it is believed that the RTD could be placed approximately 3.5 inches from hot end 312 if the hot end is exposed to 600 degrees Celsius). Note, a thermocouple is formed when two dissimilar metals are joined together. As illustrated in FIG. 4, thermocouple wire 315 is joined to copper conductor 317 at thermocouple 319, which is positioned at RTD 310. This thermocouple 319 is used to facilitate sensing the temperature difference between the hot end and RTD 310 using a pair of thermocouples (314, 319), since the signals of the two thermocouples (314, 319) can be combined electrically for such simplification. However, embodiments can be practiced using a single hot end thermocouple 314 and RTD 310. Thermocouple 319 can be any appropriate thermocouple and is wired to one of the common legs of RTD 310. This allows minimal cable wiring back to the transmitter and is a method of thermally coupling thermocouple 319 and RTD 310.

For calibration, both in manufacturing and by the end user, the sensor capsule 306 can be removed from the assembly and simply placed in a thermal calibrator to determine RTD adjustments using standard Callendar-Van Dusen equation coefficients. At that time, the thermocouple can also be evaluated for drift and adjustments can be made as appropriate. This will provide traceability for all the sensors in the heat flux assembly.

Figure 5:
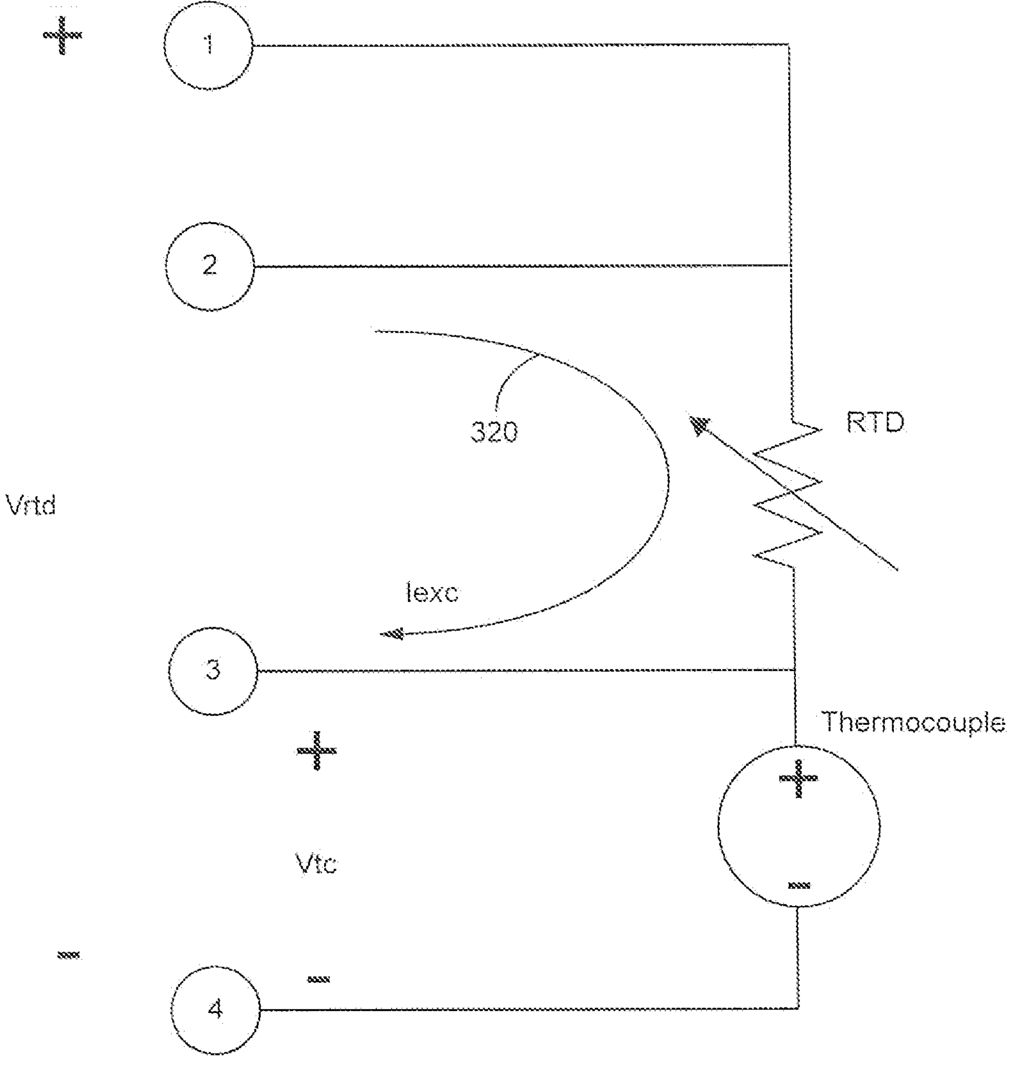
FIG. 5 is a circuit diagram of an improved heat flux sensor in accordance with embodiments of the present invention.

FIG. 5 is a circuit diagram of an improved heat flux sensor in accordance with embodiments of the present invention. The thermocouple 314 and RTD 310 measurements can easily be sensed and mathematically extracted from one another to provide two accurate sensor measurements. The RTD resistance measurement can be obtained by passing an excitation current 320 between terminals 2 and 3. While the current is illustrated as flowing in one particular direction, it could also be routed in the opposite direction. Measurements of the RTD resistance is then made by measuring the voltage across terminals 1 and 4 while the excitation current is applied. For thermocouple measurement, any excitation current should be turned off to make an accurate thermocouple emf measurement. In some examples, any excitation current could also be reversed to negate lead wire resistance by subtracting a measurement with each excitation current direction. Regardless, a voltage is measured across terminals 3 and 4 to provide the thermocouple signal.

Since sensor wiring is completed by the end user and may not be labelled, thermocouple position and polarity is preferably determined automatically by the transmitter. This can be done in a number of ways. One method is to measure the voltage between all terminals. Terminals 1-2 and 3-4 are meant to be common for the sensor. The thermocouple is placed between one of these common terminals. The measurement across the RTD between terminals 1-4 or 2-3 will also help determine the location. It will not require much thermal gradient in order to identify the thermocouple. If the general ambient temperature is known at the transmitter, and the RTD measurement is known, the polarity of the thermocouple can be determined.

The signals from the thermocouple 314 and RTD 310 can be provided as temperature sensor inputs 230 to measurement circuitry 228. Controller 222 can then apply the heat flow calculation described above. The internal process temperature (or inside surface) of the conduit can be calculated by evaluating the heat transfer through a heat flux sensor positioned on the conduit that is mounted either remotely or directly to a temperature transmitter. As set forth above, the heat flow calculation will need to know the thermal characteristics of the process fluid conduit to complete its internal conduit temperature calculation.

Figure 6:
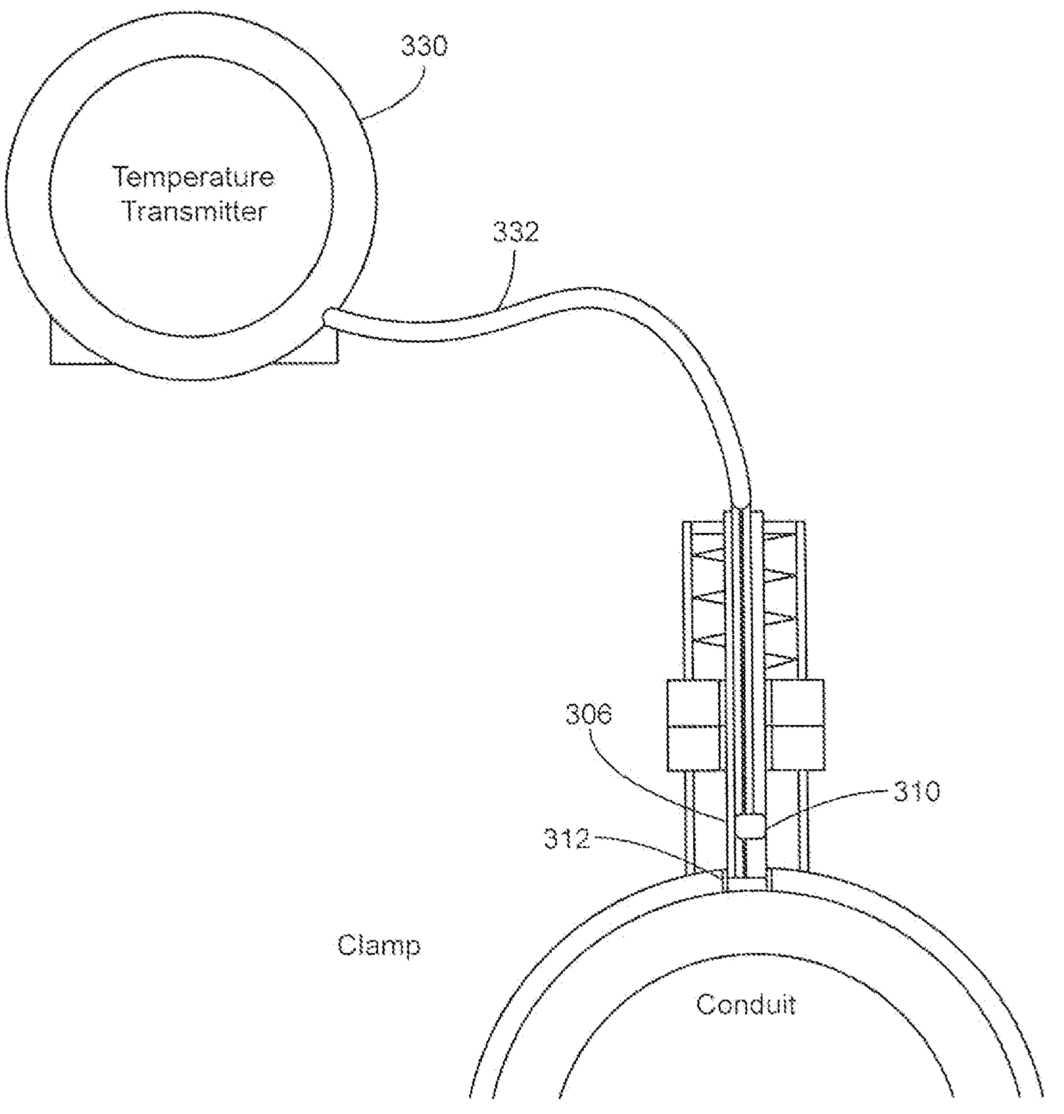
FIG. 6 is a diagrammatic view of a process fluid temperature estimation system in accordance with an embodiment of the present invention.

FIG. 6 is a diagrammatic view of a process fluid temperature estimation system in accordance with an embodiment of the present invention. As shown in FIG. 6, sensor capsule 306 includes a thermocouple positioned at end cap 312 and an RTD reference ($T_{RTD}$) 310 spaced from end cap 312. The sensor capsule 306 is electrically coupled to transmitter circuitry 330 by extension cable 332. Extension cable 332 allows transmitter circuitry 330 to be positioned at a location that may be at a lower temperature than the process fluid conduit. This lower temperature may help protect electrical components within temperature transmitter 330.

Figure 7:
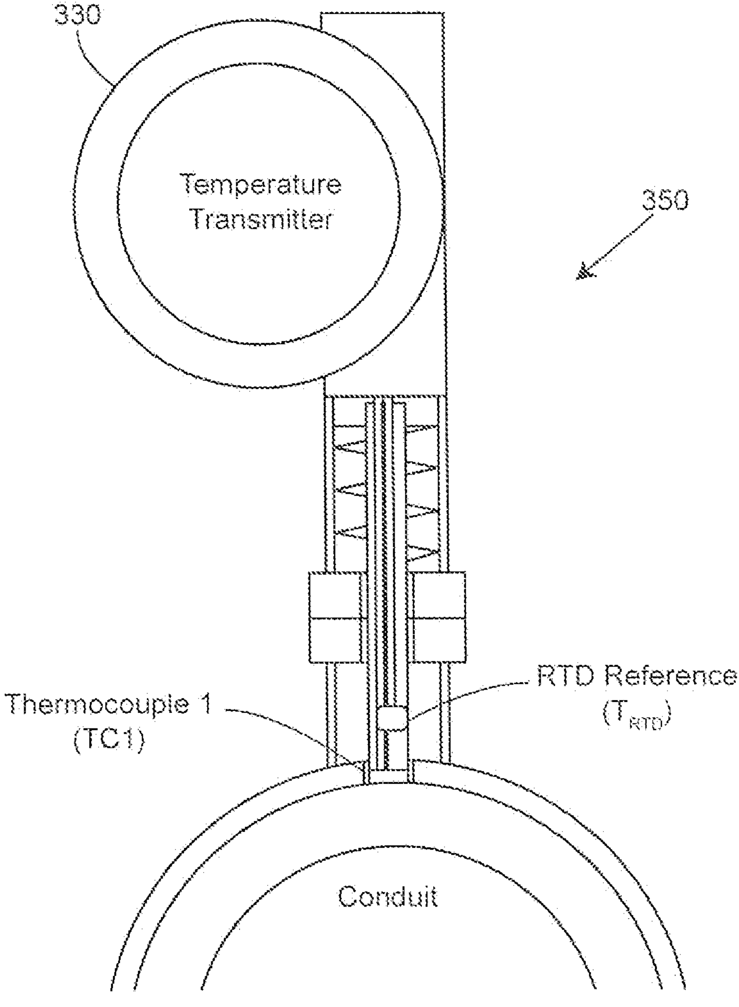
FIG. 7 is a diagrammatic view of a process fluid temperature estimation system in accordance with another embodiment of the present invention.

FIG. 7 is a diagrammatic view of a process fluid temperature estimation system in accordance with another embodiment of the present invention. System 350 is similar to the system illustrated in FIG. 6, except that transmitter circuitry 330 is mounted directly to process fluid conduit and thus no extension cable 332 (shown in FIG. 6) is required. A heat flux sensor utilizing two or more sensor measurement points can thus interface between measurement circuitry 228 as inputs to a heat flow calculation. The heat transfer between the two elements can be used in either a remote or local connection, since it is all contained within the sensor capsule assembly and does not depend on heat transfer relationship with the transmitter housing.

Figure 8:
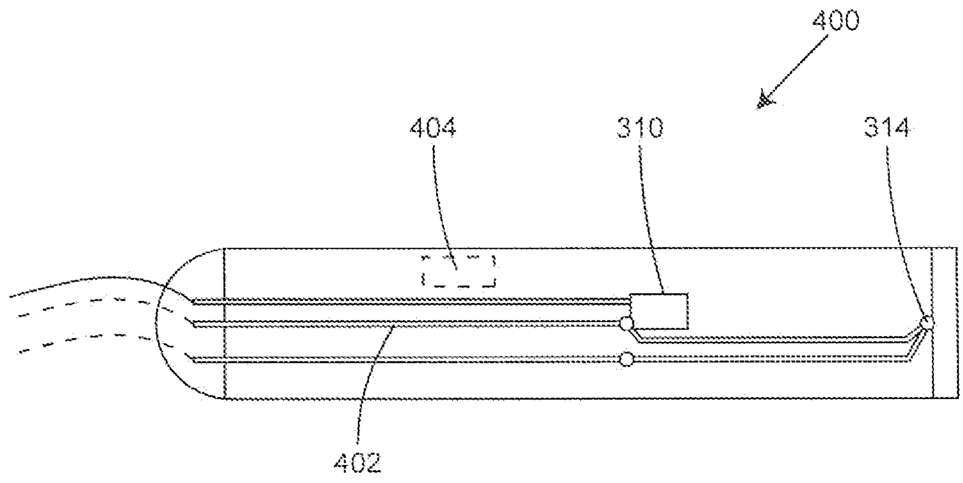
FIG. 8 is a diagrammatic view of a heat flux sensor in accordance with another embodiment of the present invention.

FIG. 8 is a diagrammatic view of a heat flux sensor in accordance with another embodiment of the present invention. Heat flux sensor 400 is similar to heat flux sensor 300 (shown in FIG. 4) except that heat flux sensor 400 only requires three copper wires. As shown, wire 402 is common to both RTD 310 and thermocouple 314. Additionally, in some embodiments, RTD 310 may have a positioned that allows for proper placement to be contained within the sensor capsule. In additional embodiments, the sensor capsule may be provided with an RFID or NFC chip 404 that contains characterizing coefficients for the Callendar-Van Dusen (CVD) equations and/or thermocouple performance information. While RFID chip 404 is shown in FIG. 8, it is expressly contemplated that the RFID chip 404 may be used with any of the embodiments described herein.

Figure 9:
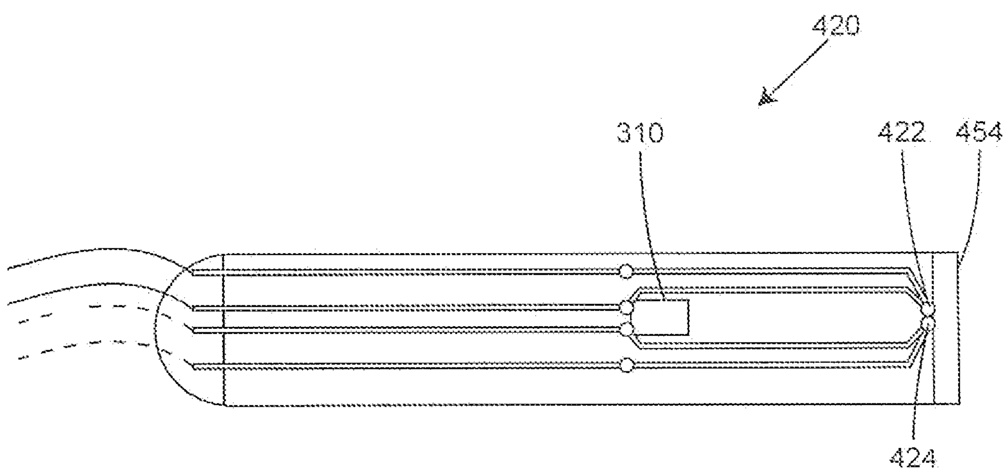
FIG. 9 is a diagrammatic view of an improved heat flux sensor in accordance with another embodiment of the present invention.

FIG. 9 is a diagrammatic view of an improved heat flux sensor in accordance with another embodiment of the present invention. Heat flux sensor 420 is similar to heat flux sensor 400 (shown in FIG. 8) except that heat flux sensor 400 includes a pair of thermocouples 422, 424 coupled to end cap 454. The provision of a pair of thermocouples 422, 424 may simplify or speed up polarity detection for the transmitter coupled to sensor 420. Additionally, the utilization of a pair of thermocouples 422, 424 also provides redundancy in the event that one of thermocouples 422, 424 should fail. As shown, the RTD reference sensor 310 is still disposed a similar distance from end cap 454 compared to sensor 400, shown in FIG. 8.

Figure 10:
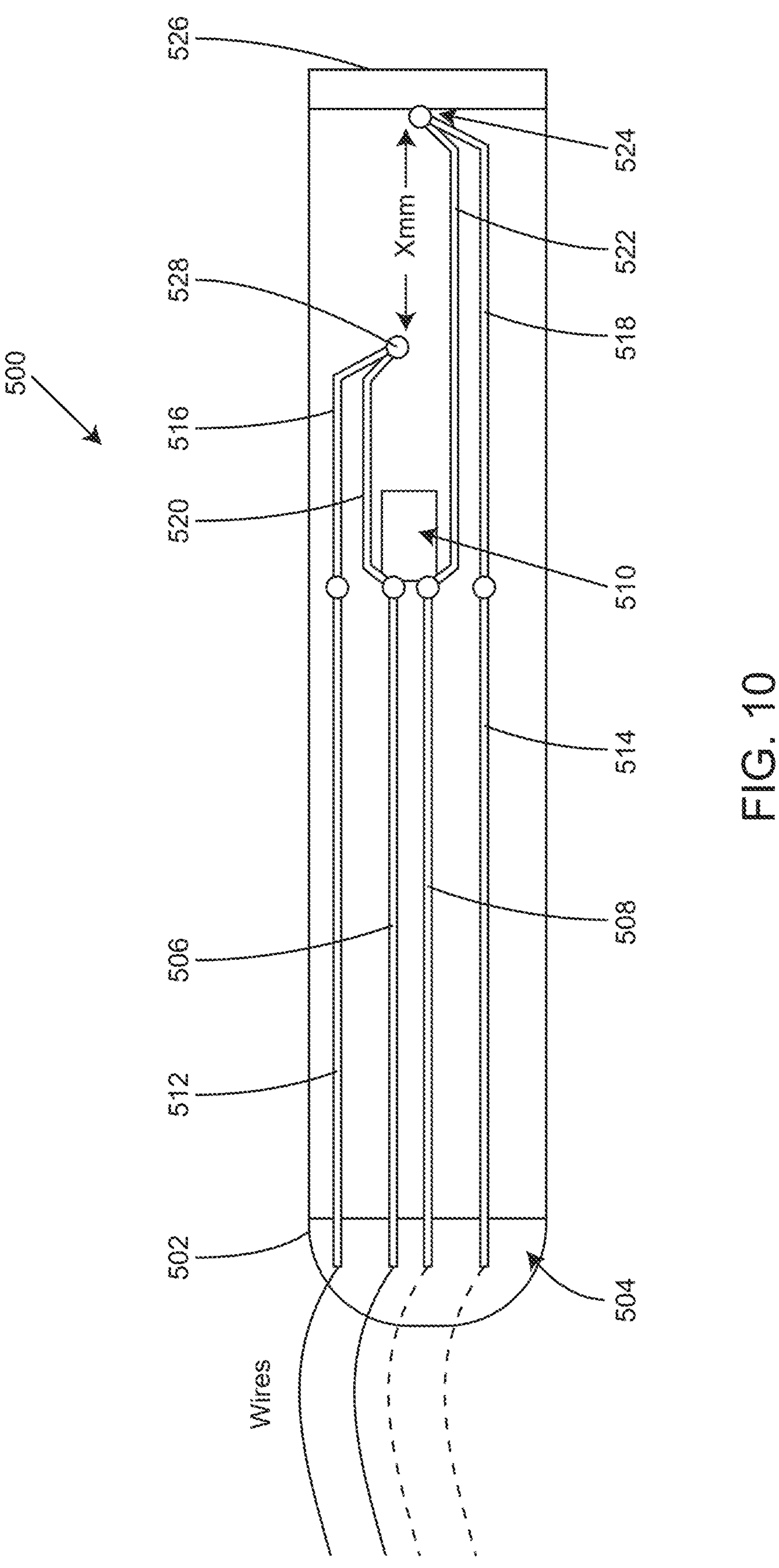
FIG. 10 is a diagrammatic view of a heat flux sensor in accordance with another embodiment of the present invention.

FIG. 10 is a diagrammatic view of a heat flux sensor in accordance with another embodiment of the present invention. As shown in FIG. 10, heat flux sensor 500 still includes four copper wires passing through the potting 502 of cold end 504. Two of the conductors 506, 508 couple to RTD reference sensor 510. Two other conductors 512, 514 couple to thermocouple conductor wires 516, 518, respectively. Additionally, as shown in FIG. 10, two other thermocouple conductor wires 520, 522 couple to copper wires 506, 508, respectively at junctions (i.e., cold-junction thermocouples) proximate RTD reference sensor 510.

FIG. 10 shows a hot end thermocouple 524 is coupled to end cap 526 while another thermocouple 528 is disposed some distance (X mm) from end cap 526 and thermocouple 524. In one embodiment, RTD reference 510 of sensor 500 is a 1000-ohm platinum RTD sensor. Selection of a sensor, such as a 1000-ohm platinum RTD sensor helps minimize the effect of lead wire resistance. The thermocouple placement for thermocouple 528 can be determined by measurement resolution and thermal conductive linearity. Accordingly, the plurality of thermocouple sensors provided in sensor 500 may provide a more accurate heat flux measurement.

There are multiple variants for a heat flux sensor in accordance with various embodiments of the present invention. Pictorially, the position of the RTD appears, in the described embodiments, to be relatively centered within the sensor capsule assembly. In practice, the position of the RTD reference sensor can be anywhere within the sensor capsule that allows for appropriate measurement requirements (including the potted cold end 504). This is also the case for the thermocouples. Moreover, the thermocouples may be grounded or ungrounded thermocouples, as desired.

Although the present invention has been described with reference to preferred embodiments, workers skilled in the art will recognize that changes may be made in form and detail without departing from the spirit and scope of the invention.

What is claimed is:

1. A process temperature estimation system comprising:

a mounting assembly configured to mount the process temperature estimation system to an external surface of a process fluid conduit having a temperature as high as 600 degrees Celsius;

a sensor capsule having an end cap configured to contact the external surface of the process fluid conduit, the sensor capsule defining a sensor capsule chamber therein;

a resistance temperature device (RTD) positioned within the sensor capsule chamber, the RTD having a pair of connection points;

a first copper conductor electrically connected to the first connection point of the RTD;

a second copper conductor electrically connected to the first connection point of the RTD;

a third copper conductor electrically connected to the second connection point of the RTD;

a fourth copper conductor;

a first thermocouple junction formed by a junction of the third copper conductor and a thermocouple wire, the first thermocouple junction being disposed within the sensor capsule chamber proximate the RTD;

a second thermocouple junction formed by a junction of the fourth copper conductor and the thermocouple wire, the second thermocouple junction being disposed within the sensor capsule and attached to the end cap;

measurement circuitry coupled to the first and second thermocouple junctions by the third and fourth copper conductors and configured to detect an emf of the first and second thermocouple junctions, the measurement circuitry being coupled to the RTD by the first, second and third copper conductors, the measurement circuitry being configured to measure a resistance of the RTD that varies with temperature of the second thermocouple junction and provide sensor temperature information; and a controller coupled to the measurement circuitry, the controller being configured to measure a reference temperature based on the resistance of the RTD and employ a heat transfer calculation with the reference temperature, the emf of the first and second thermocouple junctions and known thermal conductivity of the process fluid conduit to generate an estimated process temperature output.

2. The process temperature estimation system of claim 1, wherein the controller is configured to identify copper conductors coupled to the first thermocouple junction.

3. The process temperature estimation system of claim 2, wherein the controller is configured to determine polarity of the first thermocouple junction.

4. The process temperature estimation system of claim 1, wherein the sensor capsule is a calibrated sensor capsule.

5. The process temperature estimation system of claim 4, wherein the calibrated sensor capsule is a traceable, calibrated sensor capsule.

6. The process temperature estimation system of claim 4, and further comprising an RFID chip containing Callendar-VanDusen coefficients for the RTD.

7. The process temperature estimation system of claim 6, wherein the RFID chip also contains information relative to the first thermocouple junction.

8. The process temperature estimation system of claim 1, wherein the measurement circuitry and controller are disposed within an electronics housing that is mounted to the process fluid conduit.

9. The process temperature estimation system of claim 1, wherein the sensor capsule is electrically coupled to the measurement circuitry via an extension cable.

10. The process temperature estimation system of claim 1, wherein the RTD is spaced from the first thermocouple junction by a known thermal impedance.

11. A sensor capsule for a process temperature estimation system, the sensor capsule defining a chamber therein and comprising:

an end cap configured to contact an external surface of a process fluid conduit having a temperature as high as 600 degrees Celsius;

a resistance temperature device (RTD) positioned within the sensor capsule chamber, the RTD having a pair of connection points;

a first copper conductor electrically connected to the first connection point of the RTD;

a second copper conductor electrically connected to the first connection point of the RTD;

a third copper conductor electrically connected to the second connection point of the RTD;

a fourth copper conductor;

a first thermocouple junction formed by a junction of the third copper conductor and a thermocouple wire, the first thermocouple junction being disposed within the chamber of the sensor capsule and thermally coupled to the RTD;

a second thermocouple junction formed by a junction of the fourth copper conductor and the thermocouple wire, the second thermocouple junction being coupled to the end cap.

12. The sensor capsule of claim 11, and further comprising a potted end opposite an end of the sensor capsule having the end cap.

13. The sensor capsule of claim 12, wherein the first, second, third, and fourth copper conductors pass through the potted end.

14. The sensor capsule of claim 11, and further comprising an additional thermocouple junction disposed within the chamber of the sensor capsule.

15. The sensor capsule of claim 11, and further comprising an RFID chip containing coefficients for the RTD.

* * * * *